United States Patent
Gyanani

(10) Patent No.: US 10,017,017 B2
(45) Date of Patent: Jul. 10, 2018

(54) SOLID TIRE PERFORMANCE SENSING SYSTEM AND METHOD

(71) Applicant: Trident Industrial Tires & Tracks LLP, Pune (IN)

(72) Inventor: Ghansham Gyanani, Pune (IN)

(73) Assignee: TRIDENT INDUSTRIAL TIRES & TRACKS, LLP, Pune (IN)

(*) Notice: Subject to any disclaimer, the term of this patent is extended or adjusted under 35 U.S.C. 154(b) by 50 days.

(21) Appl. No.: 15/085,670

(22) Filed: Mar. 30, 2016

(65) Prior Publication Data

US 2017/0282657 A1     Oct. 5, 2017

(51) Int. Cl.
*B60C 23/20* (2006.01)
*B29D 30/00* (2006.01)
(Continued)

(52) U.S. Cl.
CPC .......... *B60C 23/20* (2013.01); *B29D 30/0061* (2013.01); *B29D 30/02* (2013.01);
(Continued)

(58) Field of Classification Search
CPC .... B29D 2030/0066; B29D 2030/0077; B29D 30/0061; B29D 30/02; B29K 2021/00; B29K 2621/00; B60C 19/00; B60C 2019/004; B60C 23/20; B60C 7/00; B60C 11/243; B60C 11/246; B60C 2007/005; B60C 2007/107; B60C 2200/065; G01K 1/024; G01K 13/00; G01M 17/02; Y10T 152/10027
See application file for complete search history.

(56) References Cited

U.S. PATENT DOCUMENTS 5,071,259 A   12/1991   Metzger et al.
5,731,754 A    3/1998   Lee, Jr. et al.
(Continued)

FOREIGN PATENT DOCUMENTS

CN      205097844 U    3/2016
WO      2015051534 A1  4/2015

OTHER PUBLICATIONS

International Search Report and Written Opinion issued in related PCT Application No. PCT/IB2017/051791, dated Sep. 13, 2017 (17 pages).

*Primary Examiner* — Sisay Yacob
(74) *Attorney, Agent, or Firm* — Baker Botts L.L.P.

(57) ABSTRACT

In accordance with presently disclosed embodiments, a tire monitoring system is provided. The tire monitoring system utilizes a heat sensor embedded in a solid rubber tire. The heat sensor detects a temperature of the solid tire, and a transmission system transmits signals indicative of the temperature from the heat sensor to a remote monitoring system. The remote monitoring system may monitor the temperature of the solid tire and output notifications to alert a user when preventive maintenance is needed. The heat sensor may be embedded in the solid rubber tire during the manufacture of the solid tire, or the heat sensor may be embedded into the solid tire after production of the tire is complete. The system may be used track cure time and temperature as the tire is being produced and/or to log tire performance information throughout the operation of the tire.

14 Claims, 4 Drawing Sheets

(51) Int. Cl.
  *G01M 17/02* (2006.01)
  *B60C 7/00* (2006.01)
  *G01K 1/02* (2006.01)
  *B29D 30/02* (2006.01)
  *B60C 19/00* (2006.01)
  *B29K 21/00* (2006.01)
  *B29K 621/00* (2006.01)

(52) U.S. Cl.
  CPC ............... *B60C 7/00* (2013.01); *B60C 19/00* (2013.01); *G01K 1/024* (2013.01); *G01M 17/02* (2013.01); *B29D 2030/0066* (2013.01); *B29D 2030/0077* (2013.01); *B29K 2021/00* (2013.01); *B29K 2621/00* (2013.01); *B60C 2019/004* (2013.01)

(56) References Cited

U.S. PATENT DOCUMENTS

| | | |
|---|---|---|
| 5,774,048 A | 6/1998 | Achterholt |
| 9,085,205 B2 | 7/2015 | Son |
| 2007/0063621 A1 | 3/2007 | Haswell et al. |
| 2009/0277262 A1* | 11/2009 | Rensel ................ B60C 11/24 73/146 |
| 2013/0131915 A1* | 5/2013 | Masago ................ B60C 19/00 701/33.9 |
| 2015/0034222 A1 | 2/2015 | Martin et al. |

* cited by examiner

SOLID TIRE PERFORMANCE SENSING SYSTEM AND METHOD

TECHNICAL FIELD

Embodiments of the present disclosure relate to solid tires and, more particularly, to systems and methods for sensing and monitoring the temperature of solid tires.

BACKGROUND

Solid tires are used in a wide variety of contexts, such as on vehicles used for industrial applications and non-highway service equipment. Solid tires can overheat for a number of reasons. For example, a solid tire may overheat due to excessive speeds of the tire, overload on the solid tire, environmental factors, or a combination of these. Overheating in a solid tire can lead to undesirable thermal degradation of the tire and, in some instances, service interruptions. This thermal degradation can be prevented by timely intervention (e.g., reduced speed, reduced load, etc.) before the solid tire reaches a threshold temperature or is operated at an elevated temperature for too long.

SUMMARY

In accordance with the above, presently disclosed embodiments are directed to a tire temperature monitoring system that utilizes a heat sensor embedded in a solid rubber tire. The heat sensor detects a temperature of the solid tire, and a transmission system transmits signals indicative of the temperature from the heat sensor to a remote monitoring system. The remote monitoring system may monitor the temperature of the solid tire and output notifications to alert an operator when preventive maintenance is needed.

In some embodiments, the heat sensor may be embedded in the solid rubber tire during the manufacture of the solid tire. In such instances, the system may detect and transmit temperature information to the monitoring system to track the cure time and temperature as the tire is being produced. By logging these metrics, the system may allow the manufacturers of the tires to improve the quality of the tire production process.

Data may also be transmitted from the heat sensor (and/or other sensors embedded in the solid tire) throughout the operation of the tire once it is produced. The monitoring system may use this information to log tire performance. For example, the monitoring system may track distance traveled, speed, hours in use, as well as heat generated within the solid tire throughout the tire's operation.

In some embodiments, the heat sensor may be embedded into a solid tire after production of the tire itself is complete. Specifically, the heat sensor may be positioned into an opening in the side wall of the solid rubber tire and used to log tire temperature and performance during operation of the tire. In this way, a vehicle with solid tires may be retrofit with the disclosed tire temperature monitoring system.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Figure 1:
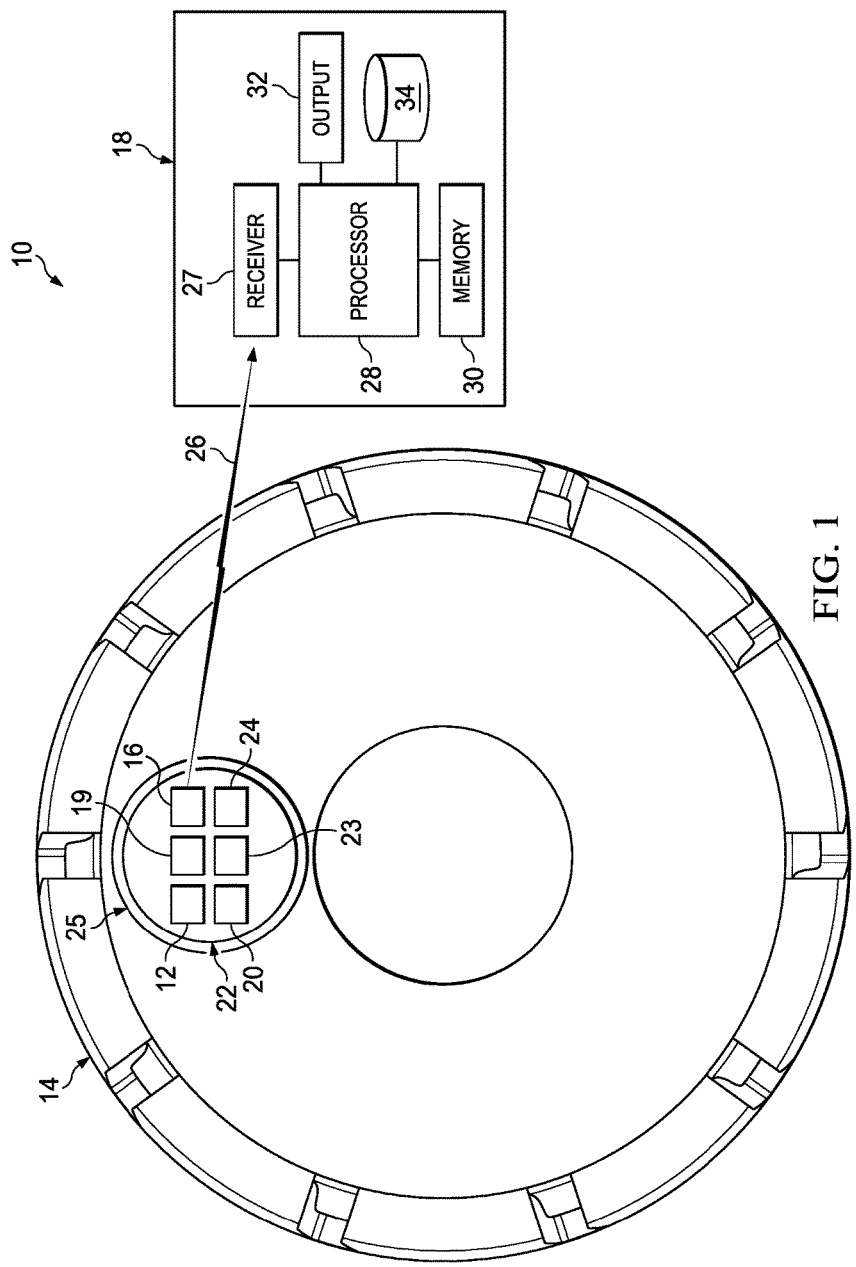
FIG. 1 is a block diagram of a system for monitoring a temperature of a solid tire, in accordance with an embodiment of the present disclosure.
Figure 2:
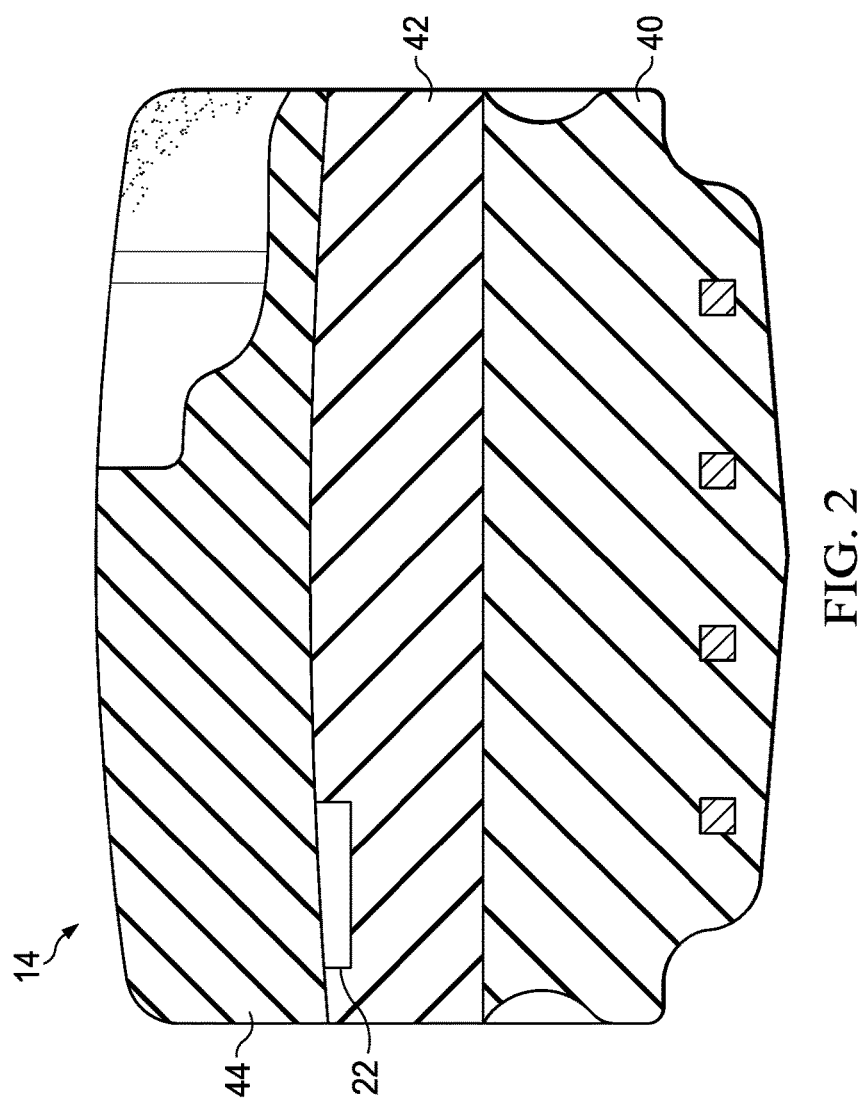
FIG. 2 is a schematic section view of a solid tire with an embedded heat sensing component disposed within layers of the tire, in accordance with an embodiment of the present disclosure.

Turning now to the drawings, FIG. 1 is a block diagram illustrating a tire monitoring system 10. The tire monitoring system 10 generally includes a heat sensor 12 embedded in a solid rubber tire 14, a transmission system 16 coupled to the heat sensor 12, and a remote monitoring system 18 communicatively coupled to the transmission system 16. The transmission system 16 is used to transmit a signal indicative of information detected by the heat sensor 12 to the monitoring system 18, which is located away from the tire 14. In some embodiments, the tire monitoring system 10 may also include a load sensor 19 embedded in the solid rubber tire 14. The transmission system 16 may be coupled to the heat sensor 12 and the load sensor 19 and used to transmit signals indicative of information detected by the heat sensor 12 and the load sensor 19 to the monitoring system 18.

As shown, the transmission system 16, heat sensor 12, and load sensor 19 may be disposed within the solid tire 14, along with one or more additional sensors 20. These additional sensors 20 may include, for example, one or more timers, speed sensors, and/or GPS sensors, although other sensors could be included as well.

In the illustrated embodiment, the heat sensor 12, load sensor 19, transmission system 16, and any additional sensors 20 may be incorporated onto a microchip 22 that is embedded into a central portion of the solid tire 14. The microchip 22 may be embedded specifically into the core of the tire 14, as opposed to the outer surface (tread) of the tire 14. The core is generally located further inward from the tread on the outer surface of the solid tire 14. This placement of the microchip 22 may enable the heat sensor 12 to detect the temperature of the tire 14 at its hottest point. This is because solid rubber tires 14 generate the most heat at their core, as opposed to pneumatic tires, which generate the most heat at the tire tread.

The microchip 22 may also include a power supply 23 that provides power needed to operate the various sensors (12, 19, 20), transmission system, and other components on the microchip 22. The power supply 23, in some cases may include a battery. In other embodiments, the microchip 22 may be self-powered, using energy available in the tire 14 as a power source. To that end, the power supply 23 may include a piezoelectric system used to gather an electrical charge based on the movement of the tire 14 and to power the microchip 22 using the piezoelectric charge.

The microchip 22 may further include a processor 24 for processing data output from the various sensors 12, 19, 20 prior to transmission of the information to the monitoring system 18. The microchip 22 may be encased via an enclosure 25 to protect the electronic components thereon. In some embodiments, the microchip 22 having the heat sensor 12 and the transmission system 16 may be embedded within the solid tire 14 at the time the tire 14 is originally manufactured. In other embodiments, the microchip 22 may be installed into the solid tire 14 after the tire 14 is initially produced.

Each solid tire 14 on a vehicle may be equipped with its own embedded heat sensor 12, load sensor 19, and corresponding transmission system 16, as described above. The tires 14 thus have an inbuilt capability to measure and transmit information about the tire 14 to the monitoring system 18 in real time. The encased microchip 22 may sense (via heat sensor 12, load sensor 19, and/or additional sensors 20), process (via processor 24), and transmit (via transmission system 16) various information about the corresponding tire 14, including heat generated (i.e., temperature of the tire 14) and load on the tire 14 while the tire 14 is in service.

The transmission system 16 may communicate this information wirelessly to the monitoring system 18 via radio frequency (RF) signals or Bluetooth signals 26. However, it should be noted that other wireless transmission protocols may be utilized in other embodiments. The transmission system 16 may communicate at a signal frequency of approximate 2.4 GHz to transmit the signal through the layers of rubber surrounding the microchip 22 in the solid rubber tire 14.

The remote monitoring system 18 may be equipped with a wireless receiver 27 for receiving signals 26 transmitted from the embedded microchip 22. The wireless receiver 27 on the monitoring system 18 may be designed to interface with the sensing/transmitting microchips 22 of multiple solid tires 14 (e.g., all tires on a particular vehicle). The monitoring system 18 may also include a processor 28, a memory 30, and an output device 32, among other things. The processor 28 may execute instructions stored in the memory 30 to process, monitor, and/or output alerts based on information received from the embedded microchip 22.

The monitoring system 18 may be a portable dash monitor or, in some embodiments, may be incorporated directly into the dashboard of a vehicle that is using the tires 14. The dash monitor may be configured to receive RF signals transmitted via the transmission system 16 on each tire 14. In other embodiments, the monitoring system 18 may be incorporated into a handheld pager device that communicates with the transmission system 16 on a given tire 14 via RF signals. In still other embodiments, the monitoring system 18 may be executed as an app on a smart phone, communicating with the transmission system 16 on a given tire 14 via Bluetooth signals. The monitoring system 18 may be incorporated into or operated on any other desirable user interface (e.g., information handling system) that enables output of notifications or alerts based on the interpretation of information received wirelessly from the tires 14.

As mentioned above, the monitoring system 18 generally includes an output device 32. In some embodiments, the output device 32 may include a display. The display may show a continuous log of temperature, load, and/or other information regarding the tires 14, as well as output visual alerts to an operator in response to detecting certain tire conditions. In addition to or in lieu of a visual display, the output device 32 may include a speaker that outputs audible signals to alert a machine operator or vehicle driver to certain tire conditions.

The monitoring system 18 may include a database 34 for storing information detected via the heat sensor 12 and other sensors 20 in each tire 14. The processor 28 of the monitoring system 18 may determine, for a given signal 26 received at the monitoring system 18, which tire 14 corresponds to the information transmitted via the signal 26. The monitoring system 18 may store the sensor information in the database 34 along with a unique identifier corresponding to the tire 14. In this manner, the monitoring system 18 may uniquely identify each tire 14 and log its performance within the database 34. The information that is monitored and stored for each tire 14 may include, for example, heat generated, load on the tire, distance travelled, speed, and hours in use of the tire 14. Such information may be collected when the vehicle equipped with the tires 14 is in operation.

The monitoring system 18 may alert a machine operator or vehicle driver when a solid tire 14 is nearing its heat resistive capacity or thermal degradation limit that might eventually lead to thermal failure. The output device 32 may provide preventive maintenance warnings related to overheating that alert the operator of the temperature approaching or reaching a tire failure temperature threshold. This gives the operator time to take necessary corrective action to mitigate the results of any tire overheating. The disclosed tire monitoring system 10 therefore allows for timely preventive intervention to prevent overheating and burning of the machine.

The processor 28 of the monitoring system 18 may compare the load information detected for each of the solid tires 14 on a vehicle to determine whether the vehicle load is evenly distributed across the tires 14. The monitoring system 18 may alert a machine operator or vehicle driver when the vehicle load is distributed unevenly between the solid tires 14 on the vehicle. The output device 32 may provide preventive maintenance warnings related to load distribution that alert the operator that the load is higher on some tires than on others. This gives the operator time to make load adjustments or other corrective action to redistribute the load evenly on the tires 14. The disclosed tire monitoring system 10 therefore allows for timely preventive intervention to prevent uneven wear on the tires 14.

In some embodiments, the tire monitoring system 10 may be operated prior to the tire(s) 14 being used on a vehicle. For example, the tire monitoring system 10 may be used during the process of producing the tire 14. To that end, the microchip 22 having the heat sensor 12, load sensor 19, and transmission system 16 may be embedded into the tire 14 while the tire 14 is being manufactured.

Figure 3:
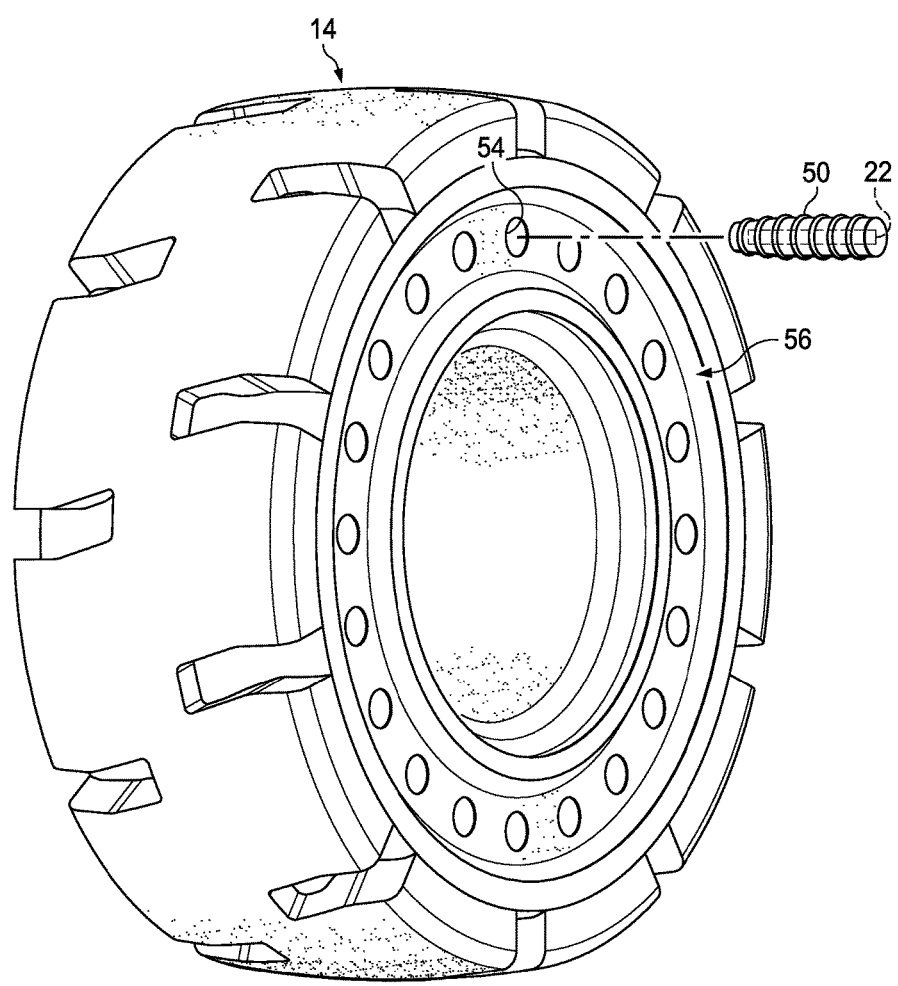
FIG. 3 is a schematic view of a heat sensing component being inserted into a side wall aperture of a solid tire, in accordance with an embodiment of the present disclosure.

The production of a solid tire 14 involves several steps including, for example, compound weighing, cracking/warming of the compound, tire building, loading/unloading of the tire, curing, and final inspection. In some embodiments, the encased microchip 22 may be embedded into the tire 14 during the tire building stage of production. This stage involves winding thin sheets of rubber (4-7 mm thick) on a rotating mandrel. The tire 14 may be constructed from up to six different types of rubber compound layers, depending on a variety of factors. FIG. 3 is a section view of a solid tire 14 that is constructed from three rubber compound layers (base layer 40, center core 42, and tread layer 44). When changing between the different rubber compounds during tire building, rotation of the mandrel is paused. In some embodiments, a portion of the center core 42 may be extruded with a slot suitable for receiving and securing the encased microchip 22 in place within the tire 14. Once the microchip 22 is positioned in the slot, the next sheet of rubber may be wrapped over the microchip 22 to continue building the tire 14. The microchip 22 may be embedded into any desirable rubber layer of the tire 14 during the tire building stage of production. At this point, the tire 14 is a soft, compressible mass. The tire 14 is later cured, making the tire 14 harden around the microchip 22 and thus securing the microchip 22 within the tire 14.

After the microchip 22 is embedded, throughout the rest of the production process the heat sensor 12 and transmission system 16 may communicate signals 26 to the monitoring system 18 to monitor cure temperature of the tire 14. The monitoring system 18 may track, via information from the heat sensor 12 and/or other sensors 20, the temperature of the tire 14 during the curing stage of production as well as the cure time for the tire 14. This information may be stored in the database 34 and later accessed by manufacturers to determine how to improve the quality of tires 14 during the manufacturing process. After the production process is complete, the same tire monitoring system 10 may be utilized as described above to monitor the performance of the tire 14 while the tire 14 is in service.

During this cure time, the heat and pressure on the solid tire 14 may be elevated. Therefore, when using a microchip 22 embedded into the core of the solid tire 14 during the tire production process, it is desirable for the microchip 22 to be encased via a protective enclosure 25. The enclosure 25 may be made from plastic that can withstand high heat and pressures encountered during the curing process. For example, the enclosure 25 may be constructed from acrylonitrile butadiene styrene (ABS), polyvinylidene fluoride (PVDF), polyethylene terephthalate (PET), or polycarbonate. The enclosure 25 may be cylindrical in shape and on the order of 5-100 mm in thickness and diameter.

In some embodiments, it may be desirable to provide the disclosed tire monitoring system 10 in a form that can be used to monitor the temperature of an already manufactured solid tire 14. In such instances, the heat sensor 12 may be designed to be inserted into the tire 14 after the tire 14 is made. Such an embodiment is illustrated in FIG. 3, which shows an encased microchip 22 (having the above described heat sensor 12 and transmission system 16) being inserted into a tire 14. The microchip 22 may be adapted for attachment to any desirable brand of solid rubber tires 14, and a corresponding monitoring system (not shown) may be communicatively coupled to the microchip 22 to monitor performance of the tire 14 once the microchip 22 is inserted. This retrofit version of the tire monitoring system 10 may be used primarily to monitor tire performance when the tire 14 is in service.

The capability and functionality of the illustrated microchip 22 may be similar to that of a microchip that is fully embedded in the tire during manufacturing of the tire, as described above. The electronic components of the microchip 22 and the corresponding remote monitoring system may be similar, although the chip enclosure may be different. For example, the retrofit version of the microchip 22 may be disposed in a specifically shaped enclosure 50 that facilitates placement and retention within an opening in the solid tire 14. As illustrated, the retrofit version of the microchip 22 may be inserted into a side wall aperture 54 of the solid tire 14. Large solid tires typically are manufactured to include such apertures 54 in the side wall 56 of the tire 14.

Figure 4:
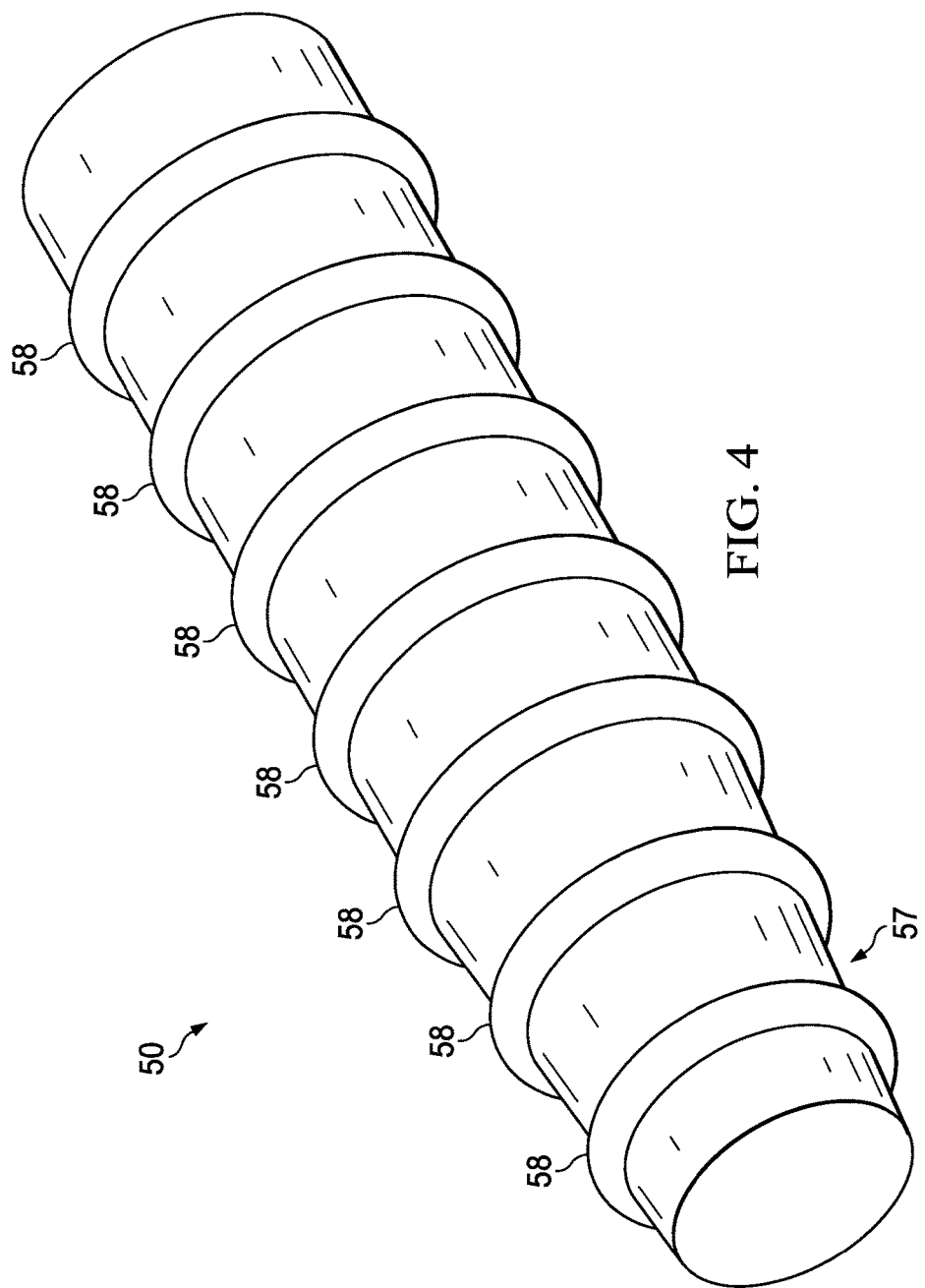
FIG. 4 is a perspective view of the heat sensing component of FIG. 2, in accordance with an embodiment of the present disclosure.

A more detailed version of the encased microchip 22 for the retrofit version of the tire monitoring system 10 is illustrated in FIG. 4. As shown, the microchip 22 may be disposed in an enclosure 50 having a conical cylinder shape (e.g., with a tapered end 57), which enables the microchip 22 to be easily guided and inserted into the side wall aperture 54 of a tire 14. The enclosure 50 may also feature self-threading and/or retaining rings 58 for retaining the microchip 22 securely within the side wall aperture 54 of the tire 14.

Although the present disclosure and its advantages have been described in detail, it should be understood that various changes, substitutions and alterations can be made herein without departing from the spirit and scope of the disclosure as defined by the following claims.

What is claimed is:

1. An apparatus, comprising;
a heat sensor;
a transmission system coupled to the heat sensor, wherein the transmission system is configured to transmit a signal indicative of information detected by the heat sensor; and
an enclosure surrounding the heat sensor and the transmission system, wherein the enclosure is shaped to be disposed and secured within an aperture in a rubber side wall of a non-pneumatic solid rubber tire, wherein the enclosure comprises a conical cylinder shaped enclosure having a tapered end.

2. The apparatus of claim 1, wherein the enclosure comprises self-threading or retainer rings disposed about an exterior of the enclosure for securing the enclosure in the side wall via direct connection between the threading or retainer rings and the side wall when the enclosure is positioned within the aperture in the side wall of the solid rubber tire.

3. The apparatus of claim 1, wherein the enclosure is constructed from heat resistant plastic.

4. The apparatus of claim 1, wherein the transmission system is a radio frequency (RF) transmitter or a Bluetooth transmitter.

5. The apparatus of claim 4, wherein the transmission system outputs the signal indicative of information detected by the heat sensor at a frequency of approximately 2.4 GHz.

6. The apparatus of claim 1, further comprising a microchip having the heat sensor and the transmission system disposed thereon, wherein the microchip is disposed in the enclosure.

7. The apparatus of claim 6, wherein the microchip further comprises a processor to process information detected by the heat sensor prior to transmission of the information.

8. The apparatus of claim 6, wherein the microchip further comprises a power supply disposed thereon to power the heat sensor and the transmission system.

9. The apparatus of claim 8, wherein the power supply is a battery.

10. The apparatus of claim 8, wherein the power supply comprises a piezoelectric system configured to convert energy from movement of the tire into electrical power.

11. The apparatus of claim 1, further comprising a load sensor coupled to the transmission system, wherein the transmission system is configured to transmit a signal indicative of information detected by the load sensor.

12. The apparatus of claim 1, further comprising one or more additional sensors disposed in the enclosure and coupled to the transmission system for detecting a distance traveled by the solid rubber tire, a speed of the solid rubber tire, a time in use of the solid rubber tire, or a combination thereof.

13. The apparatus of claim 1, wherein the enclosure is shaped to be disposed and secured within an aperture in a rubber side wall of an already manufactured non-pneumatic solid rubber tire.

14. The apparatus of claim 1, wherein the enclosure is shaped to be disposed and secured within the aperture extending into a core portion of the solid rubber tire, the core portion being located radially inward from a tread portion of the solid rubber tire.

* * * * *